US010311217B2

United States Patent
Miller et al.

(10) Patent No.: US 10,311,217 B2
(45) Date of Patent: Jun. 4, 2019

(54) APPLICATION PIRACY PREVENTION WITH SECURE ENCLAVE PROTECTION OF AUTOMATICALLY MODULARIZED FUNCTIONS

(71) Applicant: Microsoft Technology Licensing, LLC, Redmond, WA (US)

(72) Inventors: Olaf Alexander Miller, Bellevue, WA (US); Ling Tony Chen, Bellevue, WA (US); Hakki Tunc Bostanci, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 15/374,948

(22) Filed: Dec. 9, 2016

(65) Prior Publication Data

US 2018/0165428 A1 Jun. 14, 2018

(51) Int. Cl.
*G06F 8/40* (2018.01)
*G06F 8/51* (2018.01)
(Continued)

(52) U.S. Cl.
CPC .............. *G06F 21/12* (2013.01); *G06F 8/51* (2013.01); *G06F 21/53* (2013.01); *G06F 21/602* (2013.01);
(Continued)

(58) Field of Classification Search
CPC ........ G06F 21/12; G06F 21/53; G06F 21/602; G06F 21/629; G06F 8/51; G06F 8/40; G06F 2221/2149
(Continued)

(56) References Cited

U.S. PATENT DOCUMENTS 6,473,800 B1 * 10/2002 Jerger ................ G06F 21/52
709/224
6,487,665 B1 * 11/2002 Andrews ............ G06F 9/468
709/229
(Continued)

OTHER PUBLICATIONS

Frank McKeen et al., Innovative Instructions and Software Model for Isolated Execution, Intel Corporation, 2013 (Year: 2013).*
(Continued)

*Primary Examiner* — Kambiz Zand
*Assistant Examiner* — Mahabub S Ahmed
(74) *Attorney, Agent, or Firm* — The Watson I.P. Group, PLC; Vladan M. Vasiljevic

(57) ABSTRACT

A compiler automatically modularizes identified functions or portions of source code, thereby enabling developers to merely identify portions of source code that represent functionality that is to be protected, including going back and identifying such portions after the programming of the software application program has been substantially completed. Such identification can be inline, within the source code itself, or specified in an external file. During compilation of such source code, a compiler recognizes such identifications and appropriately compiles the source code such that the relevant portions of the software application program are appropriately modularized, including inserting functionality to provide for marshaling of parameters between functionality that will be protected and functionality that will be executed outside of the enclave, as well as appropriately modifying pointers or addresses to be position independent based upon where the functionality making reference to such pointers or addresses will be executed.

20 Claims, 4 Drawing Sheets

(51) Int. Cl.
  *G06F 21/12* (2013.01)
  *G06F 21/53* (2013.01)
  *G06F 21/60* (2013.01)
  *G06F 21/62* (2013.01)
(52) U.S. Cl.
  CPC .............. *G06F 21/629* (2013.01); *G06F 8/40* (2013.01); *G06F 2221/2149* (2013.01)
(58) Field of Classification Search
  USPC .......................................... 723/189; 713/189
  See application file for complete search history.

(56) References Cited

U.S. PATENT DOCUMENTS

| | | | |
|---|---|---|---|
| 6,643,775 B1 | 11/2003 | Granger et al. | |
| 6,772,340 B1* | 8/2004 | Peinado | G06F 21/10 380/201 |
| 7,228,426 B2 | 6/2007 | Sinha | G06F 21/52 713/176 |
| 7,712,143 B2* | 5/2010 | Comlekoglu | G06F 21/53 713/181 |
| 7,853,867 B2* | 12/2010 | Egilsson | G06F 8/34 715/212 |
| 8,424,082 B2* | 4/2013 | Chen | G06F 21/53 713/167 |
| 8,776,258 B2 | 7/2014 | Linsley | |
| 8,832,452 B2* | 9/2014 | Johnson | G06F 21/10 713/182 |
| 8,843,997 B1* | 9/2014 | Hare | H04L 63/0281 709/200 |
| 9,059,855 B2* | 6/2015 | Johnson | G06F 21/10 |
| 9,116,712 B2 | 8/2015 | Miller et al. | |
| 9,244,896 B2* | 1/2016 | Leithead | G06F 9/541 |
| 9,336,370 B2 | 5/2016 | Chevallier-Mames et al. | |
| 9,536,063 B2* | 1/2017 | Xing | G06F 21/12 |
| 9,864,861 B2* | 1/2018 | Xing | G06F 21/60 |
| 9,983,894 B2* | 5/2018 | Horovitz | G06F 9/45545 |
| 2003/0061279 A1* | 3/2003 | Llewellyn | G06F 9/542 709/203 |
| 2003/0177187 A1* | 9/2003 | Levine | A63F 13/10 709/205 |
| 2004/0083366 A1* | 4/2004 | Nachenberg | G06F 21/51 713/170 |
| 2004/0255268 A1* | 12/2004 | Meijer | G06F 8/447 717/106 |
| 2005/0100163 A1* | 5/2005 | Buer | G06F 21/51 380/259 |
| 2005/0172299 A1* | 8/2005 | Zhao | G06F 9/541 719/313 |
| 2006/0179351 A1* | 8/2006 | Nathan | G06F 11/3672 714/38.1 |
| 2006/0259978 A1 | 11/2006 | Pikus et al. | |
| 2009/0089507 A1* | 4/2009 | Chen | G06F 8/433 711/125 |
| 2009/0254572 A1* | 10/2009 | Redlich | G06Q 10/06 |
| 2009/0328195 A1* | 12/2009 | Smith | G06F 21/575 726/16 |
| 2010/0319001 A1* | 12/2010 | Jones | G06F 9/4411 718/108 |
| 2012/0163589 A1* | 6/2012 | Johnson | G06F 21/10 380/30 |
| 2012/0246614 A1* | 9/2012 | Sliwowicz | G06F 9/4411 717/107 |
| 2013/0039491 A1* | 2/2013 | Unagami | H04L 9/085 380/44 |
| 2013/0080993 A1* | 3/2013 | Stravers | G06F 8/433 717/104 |
| 2013/0198517 A1* | 8/2013 | Mazzarella | H04L 63/0428 713/168 |
| 2013/0212065 A1* | 8/2013 | Rahnama | H04W 4/021 707/609 |
| 2013/0232345 A1 | 9/2013 | Johnson et al. | |
| 2014/0205099 A1* | 7/2014 | Christodorescu | H04L 9/0819 380/278 |
| 2015/0052616 A1* | 2/2015 | Hutchison | G06F 21/53 726/27 |
| 2015/0089502 A1 | 3/2015 | Horovitz et al. | |
| 2015/0121536 A1* | 4/2015 | Xing | G06F 21/12 726/26 |
| 2015/0186680 A1* | 7/2015 | Johnson | G06F 21/10 713/193 |
| 2015/0278528 A1* | 10/2015 | Xing | G06F 21/53 726/26 |
| 2015/0347768 A1 | 12/2015 | Martin et al. | |
| 2015/0379076 A1* | 12/2015 | Grosse | G06F 16/2448 707/718 |
| 2016/0006754 A1 | 1/2016 | Woodward et al. | |
| 2016/0092678 A1* | 3/2016 | Probert | G06F 9/45558 713/193 |
| 2016/0124731 A1* | 5/2016 | Hill, III | G06F 8/47 717/137 |
| 2016/0171248 A1* | 6/2016 | Nesher | G06F 21/53 713/190 |
| 2017/0054557 A1* | 2/2017 | Rozas | H04L 9/0891 |
| 2017/0288875 A1* | 10/2017 | Xing | H04L 9/3242 |
| 2017/0324765 A1* | 11/2017 | McLaughlin | H04L 63/20 |
| 2017/0346814 A1 | 11/2017 | Chen et al. | |
| 2018/0113830 A1* | 4/2018 | Sherriff | G05B 19/0423 |
| 2018/0212971 A1* | 7/2018 | Costa | H04L 63/101 |
| 2018/0217941 A1* | 8/2018 | Horovitz | G06F 12/0871 |

OTHER PUBLICATIONS

G. Edward Suh et al., AEGIS: Architecture for Tamper-Evident and Tamper-Resistant Processing, ACM International Conference on Supercomputing 25th Anniversary Volume, 2003 (Year: 2003).*
David Lie et al., Architectural Support for Copy and Tamper Resistant Software, Compaq Systems Research Center, 2000 (Year: 2000).*
Kirk Brannock et al., PROVIDINg a Safe ExECUTIoN Environment, Intel Corporation, 2009 (Year: 2009).*
Blankstein, et al., "Automating Isolation and Least Privilege in Web Services", In IEEE Symposium on Security and Privacy, May 18, 2014, pp. 133-148.
"International Search Report and Written Opinion Issued in PCT Application No. PCT/US2017/064571", dated Jun. 5, 2018, 15 Pages.
Leskov, Dmitry, "Protect Your Java Code—Through Obfuscators and Beyond", Published on: Oct. 9, 2015 Available at: https://www.excelsior-usa.com/articles/java-obfuscators.html.
"Intel® Software Guard Extensions Programming Reference", Published on: Oct. 2014 Available at: https://software.intel.com/sites/default/files/managed/48/88/329298-002.pdf.
"A Primer on Intel® Software Guard Extensions (Intel® SGX)", Retrieved on: Sep. 23, 2016 Available at: https://software.intel.com/sites/default/files/managed/3e/b9/SF15_ISGC003_81_SGX_DL_100_small.pdf.
"Intel® Software Guard Extensions (Intel® SGX)", Published on: Jun. 2015 Available at: https://software.intel.com/sites/default/files/332680-002.pdf.
"Intel® Software Guard Extensions (Intel® SGX)", Retrieved on: Sep. 23, 2016 Available at: https://software.intel.com/en-us/sgx.

* cited by examiner

APPLICATION PIRACY PREVENTION WITH SECURE ENCLAVE PROTECTION OF AUTOMATICALLY MODULARIZED FUNCTIONS

BACKGROUND

Software application programs typically represent a substantial investment in human programmer resources, a return on which is only realized once the software application programs are completed and sold to end-users. To ensure a proper return on the investment of programmers' time and effort, software application programs can be designed to make the illegal copying and utilization of such software application programs, typically referred to as "piracy" of such software application programs, more difficult. Additionally, to insure that software application programs are utilized in their intended manner, anti-cheat functionality can also be added. Unfortunately, many antipiracy and anti-cheat strategies also negatively impact legitimate users of software application programs who have properly purchased and obtained a license for such software application programs. Such negative impact can result in reduced purchasing and legitimate utilization of such software application programs, which, in turn, reduces the profitability and incentive to develop software application programs. Moreover, antipiracy and anti-cheat efforts can require advanced planning so that the antipiracy, or anti-cheat, functionality is properly integrated into the software application program. Such advanced planning can be taxing on developers and programmers, who, typically, prefer to focus on the core functionality of a software application program that they are designing and programming. Unfortunately, going back after the programming and creation of a software application program has already been completed, to add in antipiracy or anti-cheat functionality, can be even more time-consuming and taxing on developers and programmers. And it can be especially difficult to add antipiracy or anti-cheat functionality to a software application program that was developed and programmed by an independent entity or group.

SUMMARY

Portions of a software application program can be protected through storage of such portions in an encrypted form, and execution of such portions only in protected memory, often referred to as an "enclave". By protecting portions of a software application program, efforts to pirate, or otherwise illegally access, such a software application program can be thwarted. Additionally, the protected portions of the software application program can reduce opportunities for cheating, or other utilization of the software application program, even by a properly licensed user, that is not in accordance with the program's design. To facilitate creation of software application program modules that can be protected in such a manner, a compiler can automatically modularize identified functions or portions of source code that have been so identified by developers. Such functionality, then, enables developers to identify such portions at any time, including after the programming of the software application program has been substantially completed. The identification of source code, embodying portions of a software application program that are to be protected, such as in an enclave, can be performed inline, within the source code itself, or the identification of specific source code can be enumerated in an external file. During compilation of such source code, a compiler can recognize such identifications and can appropriately compile the source code such that the relevant portions of the software application program are appropriately modularized, including inserting functionality to provide for marshaling of parameters between functionality that will be protected and functionality that will be executed outside of the enclave, as well as appropriately modifying pointers or addresses to be position independent based upon where the functionality making reference to such pointers or addresses will be executed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
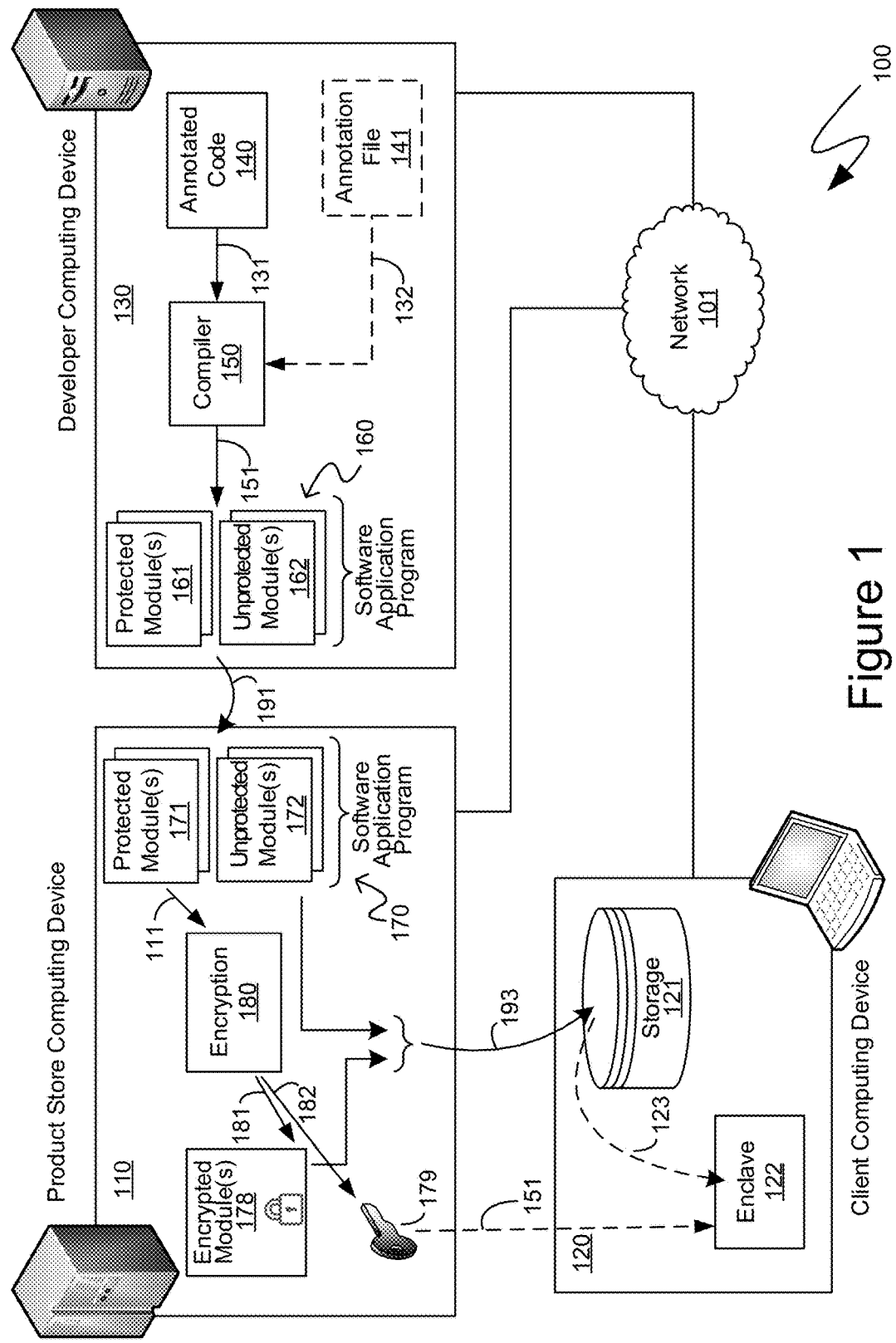
FIG. 1 is a block diagram of an exemplary system for providing application piracy prevention with secure enclave protection of automatically modularized functions.

The following description relates to a compiler, and corresponding system, that can automatically modularize a software application program such that functionality supported by identified source code is provided by separated modules that can then be encrypted and executed only within an enclave, while the remainder of the software application program can be executed in a traditional, unprotected manner, thereby providing both antipiracy and anti-cheat benefits to software application program developers with a minimum of effort on the part of such developers. To facilitate creation of software application program modules that can be protected, a compiler can automatically modularize identified functions or portions of source code, thereby enabling developers to simply identify portions of source code that represent functionality that is to be protected, including going back and identifying such portions after the programming of the software application program has been substantially completed, even though, ultimately, the strength of any such protection can be influenced by the developers' design of the software application program. The identification of source code embodying portions of a software application program that is to be protected, such as in an enclave, can be performed in line, within the source code itself, or the identified source code can be specified in an external file. During compilation of such source code, a compiler can recognize such identifications and can appropriately compile the source code such that the relevant portions of the software application program are appropriately modularized, including inserting functionality to provide for marshaling of parameters between functionality that will be protected and functionality that will be executed outside of the enclave, as well as appropriately modifying pointers or addresses to be position independent based upon where the functionality making reference to such pointers or addresses will be executed.

The techniques described herein make references to "enclaves". While hardware-supported enclaves have been developed and such functionality can be found in most modern computing devices, such as the Intel® Software Guard Extensions (SGX), the term "enclave" as utilized herein is not meant to require any specific hardware support. Instead, the term "enclave", as utilized herein, means any portion of memory, or other like computer-readable medium, that contains computer-readable instructions and/or computer-readable data that has measures to prevent computer-readable instructions that are being executed outside of the enclave from examining and/or extracting the computer-readable instructions and/or computer-readable data within the enclave. Thus, the mechanisms described are not limited to any specific hardware and/or software implemented "enclaves" and can be utilized with hardware-supported enclaves, software-supported enclaves, such as enclaves based on obfuscation, or combinations thereof.

Although not required, some of the descriptions below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, servers, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 shown therein illustrates a network 101 having communicationally coupled thereto a developer computing device 130, a product store computing device 110, and a client computing device 120. A developer or programmer of a software application program product can utilize computing devices, such as the exemplary developer computing device 130, to write, or otherwise generate, computer-executable instructions, representing the software application program product, in the form of source code, such as source code written in one or more known programming languages. As will be recognized by those skilled in the art, such source code can comprise various statements defining, delineating and constructing the functionality of the software application program, in accordance with the form of the computer programming language being utilized. For the reasons detailed previously, it can be beneficial and desirable to the developers and programmers of software application program products to discourage piracy of their software products and encourage the proper and legal purchase and licensing thereof. Furthermore, such developers and programmers design their software application programs to operate in a particular manner, and it can be further desirable to such developers and programmers to prevent users from utilizing those programs in an unintended manner, such as to cheat. However, as also indicated previously, the developers and programmers of software application programs often prefer to focus on the core functionality of their programs and often ignore, or put off, consideration of ancillary features such as antipiracy and anti-cheat capabilities. As will also be recognized by those skilled in the art, attempting to add antipiracy or anti-cheat functionality after the programming of a software application program product has been completed can be a difficult and tedious task.

According to one aspect, therefore, a compiler, such as the exemplary compiler 150, can be implemented that can, as part of the compilation of source code into executable code, perform appropriate actions to properly modularize the functionality of the software application program, represented by the source code, so that certain ones of the resulting modules can be protected, thereby imbuing the software application program with antipiracy and anti-cheat attributes. More specifically, a developer or programmer can annotate source code to identify portions of the source code, comprising statements of computing functionality as expressed within the computer programming language being utilized by the developer or programmer, that are to be protected and executed in a protected manner. One mechanism for annotating such source code can be to generate annotated source code, such as the exemplary annotated source code 140, that can comprise annotations inline within the source code itself, such as will be detailed further below. Another mechanism for annotating such source code can be to utilize an external file, such as the exemplary annotation file 141, and enumerate identified portions of source code within such an annotation file 141.

Before proceeding with a more detailed description of the operation of the compiler 150, such as could be executed on the exemplary developer computing device 130, descriptions of the rest of the exemplary system 100, shown in FIG. 1, will first be provided. As illustrated in FIG. 1, the exemplary compiler 150 can output a software application program, such as the exemplary software application program 160, from source code provided to it, such as the exemplary annotated source code 140. The exemplary software application program 160 can comprise multiple separate modules, such as portable executable files, dynamically linked library files, object files, and other like modules, which, together, can represent the software application program 160 in a form that is directly executable on one or more client computing devices, such as the exemplary client computing device 120. The modules of the exemplary software application program 160 can, in accordance with the annotations or identifications provided by programmers and developers of the software application program, comprise both one or more unprotected modules, such as the exemplary unprotected modules 162, as well as one or more protected modules, such as exemplary protected modules 161. As utilized herein the term "protected module" means a file, package, or other like collection of computer-executable instructions and/or computer-readable data that is to be provided in a protected manner, such as in an encrypted form, and is to be utilized in a protected manner, specifically by executing such computer-executable instructions, and reading such computer-readable data, only within an "enclave", as that term was defined previously.

According to one aspect, and as will be described in detail below, the one or more protected modules 161 can be identified as modules that are to be protected by metadata about the modules that can be generated by the compiler 150 during the compilation of the annotated code 140 into software application program 160, comprising the modules 161 and 162. A creator of a software application program, such as a developer utilizing the exemplary developer computing device 130 to create the exemplary software application program 160, can then copy such a software application program 160 to an independent computing device from which such a software application program can be downloaded, or otherwise purchased and obtained by end users or clients. For example, the exemplary software application program 160 can be copied to an exemplary product store computing device 110, as illustrated by the copy action 191. The exemplary software application program 160, and the corresponding one or more protected modules 161 and the one or more unprotected modules 162, are separately identified as the exemplary software application program 170, one or more protected modules 171, and one or more unprotected modules 172, on the product store computing device 110 to indicate that they are a separate copy from those on the exemplary developer computing device 130.

According to one aspect, after receiving a copy of a software application program comprising modules whose metadata indicates that they are to be protected modules, such as the exemplary software application program 170, comprising the one or more protected modules 171 as well as the one or more unprotected modules 172, processes executing on the product store computing device 110 can encrypt the one or more protected modules 171, such as by an encryption component 180, resulting in an encrypted collection of one or more modules, such as the exemplary encrypted modules 178, as well as resulting in the generation of a cryptographic key, such as exemplary cryptographic key 179, which can be utilized to decrypt encrypted modules 178 back into the protected modules 171. The provision of the one or more protected modules 171 to the encryption component 180 is illustrated in FIG. 1 by the arrow 111, and the generation of the resulting encrypted modules 178 and corresponding cryptographic key 179 is illustrated by the arrows 181 and 182, respectively.

The exemplary product store computing device 110, after generating the encrypted modules 178 can make the software application program 170, now comprising the unprotected modules 172 and the encrypted modules 178, available for download to clients of the products store. For example, a user utilizing a client computing device, such as the exemplary client computing device 120 can download, as illustrated by the arrow 193, the software application program 170, again, now comprising the unprotected modules 172 and the encrypted modules 178. According to one aspect, when the user executes such a software application program, the encrypted modules 178 can be loaded into an enclave, such as exemplary enclave 122, as illustrated by the arrow 123. A check can be made, such as in a manner detailed further below, as to whether the user has appropriately purchased, licensed, or otherwise obtained the software application program. Assuming that the user has, in fact, appropriately obtained the software application program, the cryptographic key 179 can be provided to the client computing device 120, such as from the product store computing device 110, either directly or indirectly, as illustrated by the arrow 151. The cryptographic key 179 can then be utilized to decrypt, within the enclave 122, the encrypted modules 178 into the protected modules 171, which can then be executed in a protected manner within the enclave 122.

The execution of the protected modules 171, from within the enclave 122, in combination with the execution of the unprotected modules 172 in a traditional, unprotected manner, can result in the software application program properly executing on the client computing device 120 and providing the user of the client computing device 120 with access to all of the functionality that such a software application program was intended to provide to a user that had properly obtained such a software application program. By contrast, if the user of the client computing device 120 had not properly obtained such a software application program, then the cryptographic key 179 would not be provided to the client computing device 120, and those portions of the software application program whose functionalities are supported by the protected modules 171 would not be provided to the user of the client computing device 120 because the encrypted modules 178 would remain in an encrypted form, and, thus, not executable on the client computing device 120. Consequently, the user of the client computing device 120, having not properly obtained the software application program, would be left with a form of the software application program lacking whatever functionality was supported by the protected modules 171, which can be functionality that can be critical to the user's enjoyment or utilization of the software application program. In such a manner, the software application program can be imbued with antipiracy attributes.

Additionally, even for users that have properly obtained the software application program, the protected modules 171 can provide functionality that the developer or programmer of the software application program may particularly seek to avoid having users modify. For example, the software application program can be a game, or an educational aid, such as a practice test, and, within such a context, certain aspects, such as scoring functionality, or character life point functionality, can be desirable to protect, and prevent a user from modifying, in order to ensure that the user properly utilizes the software application program and does not "cheat". Such scoring, lift point, or other like important functionality can be supported by the protected modules 171, which, for users that have properly obtained the software application program, can be decrypted and executed from within the enclave 122, such that those users are provided with the functionality of the software application program, but are still prevented from modifying at least certain aspects of that functionality, such as those aspects directed to scoring functionality, life point functionality, or any other like functionality supported by the protected modules being executed from within the enclave 122. In such a manner, the mechanisms described also imbue software application programs, not only with antipiracy attributes, but also with anti-cheat attributes as well.

Within such a context, operation of the exemplary compiler 150 can be described in further detail. More specifically, a programmer or developer of the exemplary software application program 160 can annotate specific portions of source code, representing a programmed implementation of functionality of the software application program 160 that such a programmer or developer seeks to protect. According to one aspect, the functionality being protected can be functionality that is critical to proper utilization of the software application program 160, such that an inability to access such functionality substantially reduces the desirability of the software application program, or such that an inability to modify such functionality prevents the software application program from being utilized in an unauthorized, or improper, manner. Additionally, the functionality to be protected can be functionality that cannot be easily faked or shimmed. For example, there may be little benefit to protecting functionality whose output is nothing more than a binary value, since such a binary value could simply be guessed, or otherwise faked, and the application could continue to execute properly even if the protected functionality was never itself allowed to execute. Therefore, within the context of a game, for example, a developer could annotate those portions of source code that define and implement how the character's life points, or other like attribute, is determined throughout the course of gameplay. As another example, within the context of an educational software application program, a developer could annotate those portions of source code that define and implement how timing, scoring, or other like test taking parameters are determined.

Although the mechanisms described, are equally implementable with any portions of the source code of any software application program being identified, or annotated, to be protected, recognition of inherent implementation aspects can enable developers to minimize any negative performance impact from such antipiracy and anti-cheat efforts. More specifically, access to functionality implemented by computer-executable instructions executing from within an enclave can be slower than access to equivalent functionality implemented by computer-executable instructions executing outside of the enclave. Similarly, computer-readable data stored within an enclave can be accessed more slowly by computer-executable instructions executing outside the enclave. Consequently, the source code identified by a developer or programmer to be protected can be source code that will not be frequently called by, and does not frequently call out to, other functionality that is not identified to be protected.

As indicated previously, one manner in which source code, to be separately modularized and subsequently protected, can be identified, such as by a programmer or developer, can be through identifications that are placed directly in line within the source code files themselves. For example, specific, predefined keywords can be utilized as a prefix that can signify such identification. Within the source code, then, section pragmas or declspecs prefixed with such an enclave keyword can delineate sections of source code that a developer or programmer wants to identify. Any pragma notation can be used to identify portions of the source code. For example, the standard "code_seg" pragma can be used to identify multiple contiguous functions such that all functions defined after this pragma are considered to have been identified. As another example, the "data_seg" pragma can be used to identify global variables that can be defined next to each other within the source code. As yet another example, a "declspec" identification can be used to selectively identify functions and data, that are not contiguous and are, instead, scattered throughout the source code.

Another manner in which source code can be identified, again, to be separately modularized and subsequently protected, can be through the use of an external file or other external declaration. For example, an eXtensible Markup Language (XML) file can be utilized to identify specific functions and global variables, among other structures, of the source code. Such an external file can also enable developers to identify portions of source code that they do not themselves own or have the right to directly modify, such as to insert such identifications inline in the manner detailed previously. Within FIG. 1, the annotated source code 140 can comprise annotations directly in-line within the source code, such as those detailed above, and, consequently, when consumed by the compiler 150, as illustrated by the arrow 131, the annotated source code files 140 can comprise the extent of the information required by the compiler 150. Conversely, if an external file or other external declaration is utilized, such as the exemplary annotation file 141, then the compiler 150 can also receive such an annotation file 141 as input, in addition to the annotated source code 140, as illustrated by the arrows 132 and 131, respectively. The annotation file 141, and corresponding arrow 132, illustrated in FIG. 1 with dashed lines to indicate that they are an optional alternative.

As represented by the arrow 151, the compiler 150 can, based on the annotations and identifications, generate one or more protected modules, such as exemplary protected modules 161, and one or more unprotected modules, such as exemplary unprotected modules 162, of the software application program 160. One mechanism by which the compiler 150 can perform such modularization can be to determine invocations made of identified functions, and invocations made by such functions, and then establish appropriate marshaling of parameters, and other like cross-boundary implementations to facilitate the invocation of functions, performed by computer-executable instructions executing within an enclave, by computer-executable instructions executing outside of the enclave, and vice versa, as well as to facilitate access of computer-readable data that is maintained outside of the enclave by computer-executable instructions executing within the enclave. For example, in order to protect computer-executable instructions being executed within an enclave, an intermediate process can be established as a gatekeeper such that calls to functions, supported by computer-executable instructions being executed within the enclave, can first be directed to the intermediate process, which can, itself, be supported by computer-executable instructions that also execute within the enclave, and then that intermediate process can make a further call, from within the enclave, to the originally intended function. In such a manner, access to computer-executable instructions being executed within the enclave can first be directed to, and can pass through, such gatekeeping functionality. In such an example, if a function within the source code 140 makes a call to another function, also within the source code 140, where that second function was identified, such as by the developer or programmer, as being a function that is to be protected, then the call by the first function to the second function can be modified by the compiler 150 as part of the compilation of the source code 140. For example, the compiler 150 can insert a call to the aforementioned intermediate process.

As another example, the compiler 150 can insert mechanisms by which the parameters are passed between functions that will be performed, after compilation by the compiler 150, by computer-executable instructions that will be executed outside of the enclave and functions that will be performed by computer-executable instructions that will be executed within the enclave. More specifically, in order to protect the computer-executable instructions executing within the enclave, mechanisms, by which calling functions can provide parameters to functions supported by computer-executable instructions that will be executed within the enclave, can be limited. For example, only a single parameter may be allowed to be passed between computer-executable instructions executing outside the enclave and computer-executable instructions executing within the enclave. In such an instance, if a calling function needed to pass multiple parameters, then such multiple parameters can be aggregated, such as into an array of parameter values, or, an array comprising pointers to individual parameter values. Then only a single parameter, namely a pointer to the array, would need to be passed between computer-executable instructions executing outside the enclave and computer-executable instructions executing within the enclave. Consequently, another action that can be performed by the compiler 150 can be to modify the passing of parameters from functions, within the annotated source code 140, that invoke other functions that were identified by the programmer or developer as being functions that should be protected. Such a modification, for example, can comprise the storing of parameter values, or pointers to parameter values, into an array and then passing only a pointer to that array.

An additional aspect of executing certain portions of the software application program 160 within an enclave can be that instruction pointers and program counters within the enclave can differ from those outside of the enclave. Thus, according to one aspect, the compiler 150 can, as part of the compilation process, modify references to instruction pointers, program counters, or other like address identifiers from identifying addresses in a relative manner to identifying addresses in a position-independent manner. More specifically, the compiler 150 can identify references to instruction pointers, program counters, and other like address identifiers within functions, or other portions of the annotated source code 140, that have been identified to be protected, and can change such address identifiers to be position-independent if they will reference addresses outside of the enclave. Alternatively, or in addition, the compiler 150 can identify references to address identifiers within functions, or other portions of the annotated source code 140, that have been identified to be protected, and can change all such address identifiers to be position independent to facilitate their execution within the enclave itself, which, as indicated, can have different addressing schemes than memory outside of the enclave.

Figure 2:
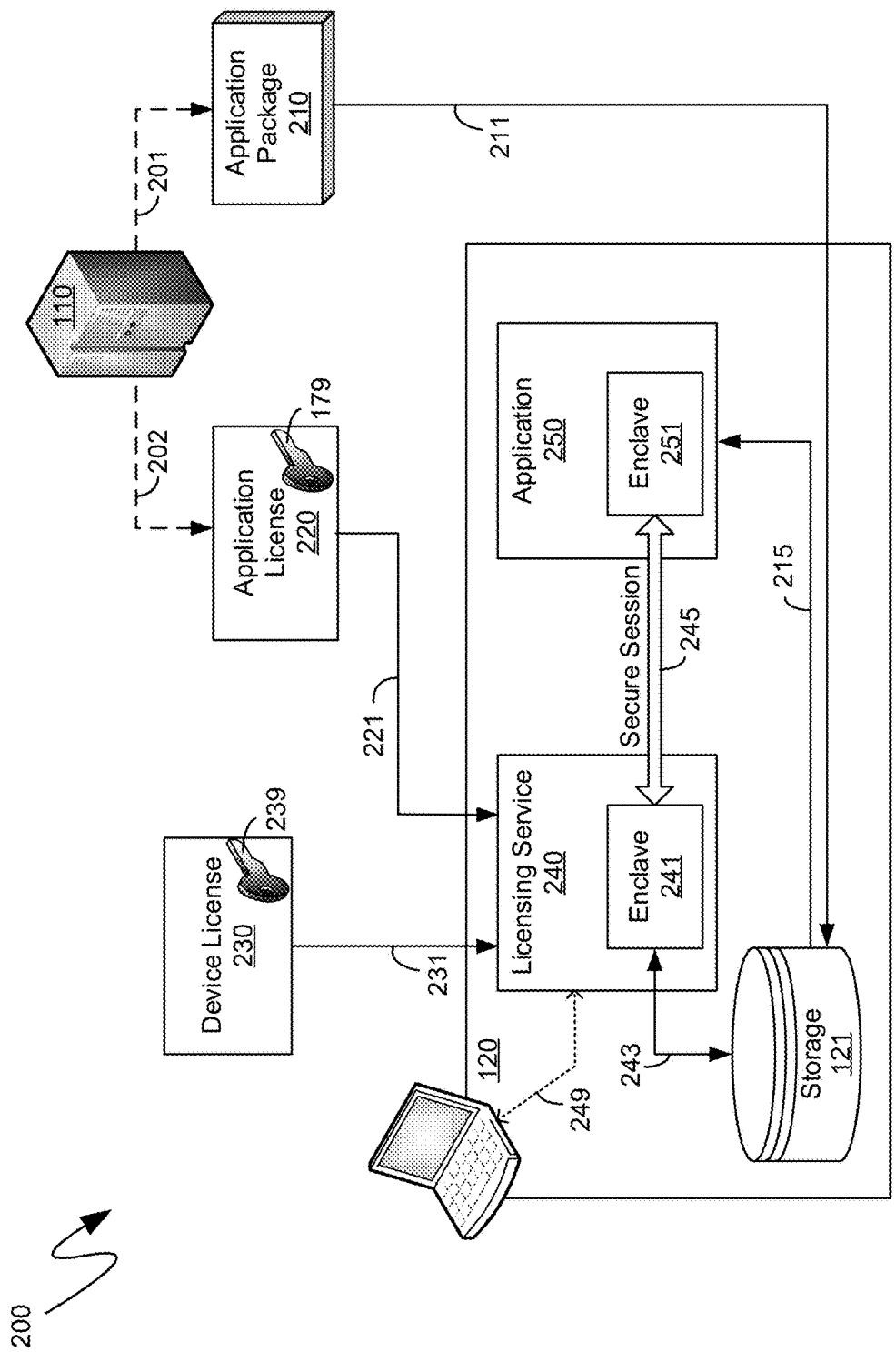
FIG. 2 is a block diagram of another exemplary system for providing application piracy prevention with secure enclave protection of automatically modularized functions.

Turning to FIG. 2, the exemplary system 200 shown therein illustrates an exemplary distribution of a software application program product created in the manner illustrated by the system 100 of FIG. 1, and detailed above. More specifically, the compiler 150, shown in FIG. 1, can facilitate the creation of one or more protected modules 161 and one or more unprotected modules 162, which can then be provided to services independent of the developer or programmer of the software application program. For example, in FIG. 1, the protected modules 161 and the unprotected modules 162 were shown as being provided to a product store computing device 110, which could then encrypt the protected modules utilizing cryptographic information that can be maintained by the product store computing device 110, such as in the form of the cryptographic key 179. In the exemplary system 200 of FIG. 2, then, the product store computing device 110 can make available both an application package, such as exemplary application package 210, which can be downloaded by users, and it can also make available an application license, such as exemplary application license 220, which can comprise, or otherwise reference, the cryptographic information 179 that can facilitate decryption of protected portions of the application contained in the application package 210.

Within the exemplary system 200 of FIG. 2, the exemplary user computing device 120 is shown, via the arrow 211, as downloading the application package 210. As will be recognized by those skilled in the art, the obtaining of such an application package 210 can typically be through content distribution networks or other like mechanisms, such as entities that maintain geographically diverse server farms and allow for the efficient downloading of large quantities of digital data by multitudes of geographically distributed users. The dashed lines of the arrow 201 are meant to represent that the application package 210 need not be provided directly by a product store computing device 110, but can, instead, be obtained by the user computing device 120 through multiple intermediaries. Similarly, the application license 220 can be obtained by the user computing device 120, as represented by the arrow 221, through many different mechanisms and intermediaries. Again, to represent that the application license 220 can comprise information that originates from, for example, the product store computing device 110, but can be provided to the user computing device 120 through multiple different levels of intermediaries, the arrow 202 is shown with dashed lines.

According to one aspect, a licensing service, such as the exemplary licensing service 240, can execute on the client computing device 120. Such a licensing service 240, camp, according to such an aspect, obtain identifying information from the client computing device 120, as illustrated by the arrow 249. Such identifying information can comprise unique identifiers of various aspects of the client computing device 120, including, for example, a unique identifier of the BIOS of the client computing device 120, a unique key of a Trusted Platform Module (TPM) of the client computing device 120, a MAC address of a network card of the client computing device 120, and one or more other like identifiers.

Utilizing such identifying information, the licensing service 240 can communicate with an external licensing system in order to obtain, for example, a device license 230 that can comprise cryptographic information 239. According to one aspect, the cryptographic information 239 can enable the client computing device 120 to execute applications, such as the exemplary application 250, in an off-line manner and without having to obtain the application license 220 independently each time the client computing device 120 executes the application 250. More specifically, the cryptographic information 179 can be encrypted utilizing the cryptographic information 239 and, in such an encrypted manner, can be stored locally on the client computing device 120, such as in on a storage medium 121, as represented by the arrow 243. Alternatively, or in addition, some hardware-based enclave technology, such as the aforementioned SGX technology, can also provide mechanisms by which the enclave can be granted access to a device specific key, which can be an implementation of the cryptographic information 239 shown in FIG. 2. Such mechanisms can then be utilized by such hardware-based enclave technology to encrypt the cryptographic information 179 for future offline use of, for example, the exemplary application 250. In some instances, the cryptographic information 239 will remain the same as before if the computer-executable instructions being executed within the enclave, such as the enclaves 241 or 251, are exactly the same as before.

Chronologically, a user utilizing the client computing device 120 can identify a software application program that the user seeks to purchase, such as by downloading and obtaining a license thereto. As will be recognized by those skilled in the art, users can find such software application programs through online stores or other like network-accessible systems within which users can browse, select and purchase software application programs. An application package, such as the exemplary application package 210, can then be downloaded to the client computing device 120, such as in the manner detailed previously. The application package 210 can be in a compressed or archived format such that it can be unpacked and then stored, such as on a storage media, including exemplary storage media 121, of the client computing device 120. The software application program, illustrated as the application 250, can then be executed from such a storage media 121, as illustrated by the arrow 215.

As part of the execution of the application 250, computer-executable instructions can identify encrypted portions thereof that are to be executed in a protected manner, such as those portions created in the manner detailed above. Such portions of the application 250 can be placed within an enclave 251, in an encrypted form, and can then be decrypted within the enclave 251. To decrypt such encrypted portions, within the enclave 251, relevant cryptographic information, such as the cryptographic information 179, can be required. To provide antipiracy protection, a determination can be made as to whether the client computing device 120 is properly licensed to execute the application 250. According to one aspect, such a determination can comprise the functionality of the aforementioned licensing service 240. For example, the licensing service 240 can have been executed as part of the startup procedures of the client computing device 120. As part of the execution of the licensing service 240, it can measure the client computing device 120, as represented by the arrow 249, and obtained therefrom identifying information. In combination with an external service such identifying information can be utilized to determine the identity of the client computing device 120, an identity which can be manifested within a device license 230, which can be obtained by licensing service 240, as represented by the arrow 231.

The application 250 can be licensed to execute on the client computing device 120 by encrypting the cryptographic information 179, of the application 250, that can be provided as part of the application license 220, with the cryptographic information 239 that is associated with the device license 230. If a computing device, then, is not identified as the client computing device 120, such as based on the identifying information collected by the licensing service 240, it can be prevented from obtaining the cryptographic information 239 and, thus, may not be able to decrypt the cryptographic information 179 in order to decrypt the protected portions of the application 250 in the enclave 251. Conversely, if a computing device is identified as the client computing device 120, the licensing service 240 can obtain access to the cryptographic information 239. With such cryptographic information 239, the licensing service 240 can decrypt the cryptographic information 179 which, as indicated previously, and has been encrypted with the cryptographic information 239 in order to tie the license of the application 250 to the client computing device 120. The licensing service 240 can then provide the cryptographic information 179 to enable those portions of the application 250 that are encrypted, to be decrypted within the enclave 251 and, thereby, enable the application 250 to execute properly on the client computing device 120.

According to one aspect, the licensing service 240 can itself comprise protected computer-executable instructions that can be encrypted, and can be safely decrypted within an enclave, such as exemplary enclave 241. More specifically, the obtaining of the device license 230, and the corresponding cryptographic information 239, can enable the licensing service 240 to pass such cryptographic information 239 to the enclave at 241, thereby enabling those portions of the licensing service 240, existing within the enclave 241 in an encrypted form, to be decrypted and to execute within the enclave 241. As part of the execution of those portions of the licensing service 240, within the enclave 241, such portions can obtain the encrypted version of the cryptographic information 149, such as from the storage media 121, and can decrypt, within the enclave 241, the cryptographic information 179. Such cryptographic information 179 can then be provided to the enclave 251, to decrypt the portions of the application 250 that execute within the enclave 251. The provision of the cryptographic information 179, from executable-instructions of the licensing service 240 executing within the enclave 241 to computer-executable instructions of the application 250 executing within the enclave 251 can be via a secure session 245 that can be established between two enclaves, such as in a manner known to those skilled in the art. Because the cryptographic information 179 can be stored, in the aforementioned encrypted form, locally on the client computing device 120, such as on the storage media 121, safely, when encrypted by the cryptographic information 239, the application 250 can be executed in an off-line manner because all of the information needed to decrypt those portions of the application 250 that will execute within the enclave 251 can be resident on the client computing device 120, except merely in a form protected by the licensing service 240.

The establishment of enclaves, such as the enclaves 241 and 251, and the provision of cryptographic information thereto, and the decryption therewithin of previously encrypted computer-executable instructions and computer-readable data, utilizing such cryptographic information, is provided in greater detail in co-pending U.S. patent application Ser. No. 15/163,443, filed on May 24, 2016 and entitled "Using Hardware Based Secure Isolated Region To Prevent Piracy And Cheating On Electronic Devices", the contents of which are herein incorporated by reference in their entirety, for any teachings contained therein, including, but not limited to, the greater detail regarding the topics explicitly enumerated previously.

Figure 3:
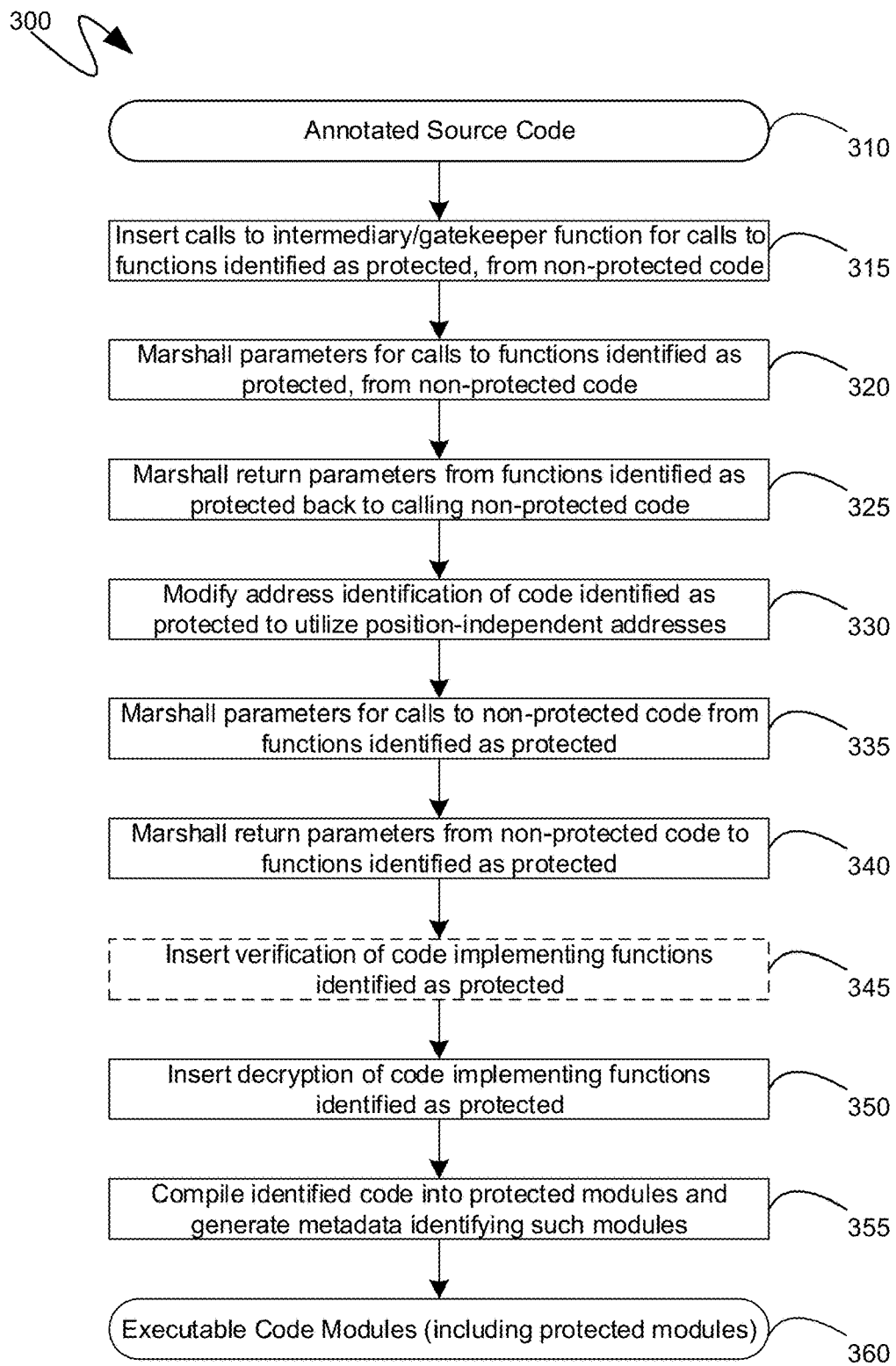
FIG. 3 is a flow diagram of an exemplary provision of application piracy prevention with secure enclave protection of automatically modularized functions.

Turning to FIG. 3, the flow diagram 300 shown therein illustrates an exemplary series of steps that can be performed by the exemplary compiler 150 described previously with reference to FIG. 1. As indicated previously, such an exemplary compiler can enable developers and programmers to identify portions of source code that represent aspects or functionality of a software application program that is to be protected, such as for antipiracy and anti-cheat objectives. Consequently, the exemplary flow diagram 300, shown in FIG. 3, can commence with step 310, which can comprise receipt of annotated source code files having such developer-inserted or programmer-inserted identifications therein. Subsequently, as part of the compilation of the annotated source code 310, the exemplary compiler can modify the source code, compile it and then subsequently modularize the resulting, compiled computer-executable instructions into modules that can be encrypted and executed in an enclave and also into unprotected modules that need not be executed within such an enclave. Although the steps of the exemplary flow diagram 300 are illustrated in a sequential manner, their illustration is not meant to signify a causal, or dependent, relationship, and, as such, any one or more of the steps of the exemplary flow diagram 300 could be executed in any order, or in parallel with one another.

At step 315, the compiler can determine calls to functions that the developer has identified as protected, from other functions that are not so identified, and, based on such a determination, the compiler can modify such function calls to insert calls to an intermediary or gatekeeper function through which protected functionality can be accessed, such as in accordance with the protection mechanisms to which the source code is being compiled. At step 320, parameters passed to functions that have been identified as being protected, from source code not so identified, can be marshaled in accordance with the protection mechanisms to which the source code is being compiled. For example, as detailed previously, for some enclave implementations, only a single parameter may be allowed to be passed into code executing within such an enclave. In such an instance, if a function, supported by such code executing within an enclave, is to be called with multiple parameters being provided to such a function, then those parameters can be stored in an array, or pointers to such parameters can be stored in the array, and then the function can be invoked with only a single parameter, namely a parameter identifying the array. Other marshaling mechanisms can likewise be utilized. For example, with an obfuscation enclave, parameters may be marshalled in regular registers and on the stack, as opposed to through an array of parameters. Irrespective of the exact marshalling mechanisms utilized, which are likely to be specific to the type of enclave being implemented, at step 320, the source code can be modified to account for such marshaling of parameters. In an analogous manner, at step 325, the results of the called function, or the return parameters, can likewise be marshaled from the computer-executable instructions performing the called function, which, because the function was identified as protected, can execute within the enclave. Thus, at step 325, the results can, for example, also be stored in an array, and the calling function can receive only a single parameter, namely a pointer to that array.

At step 330, the source code that was identified by the developer to be protected can be modified, if appropriate, so that references to instruction pointers, program counters, or other like addresses utilized position-independent referencing, instead of relative addresses, because, in certain instances, such identified source code can be compiled into computer-executable instructions that can execute within an enclave having an independent addressing scheme from the memory in which the remaining computer-executable instructions are executed.

The marshaling of parameters, such as that performed at steps 320 and 325, can be similarly performed, at steps 335 and 340, for the invocation of functions that were not identified as being protected, when such functions are invoked by source code that was identified as being protected. Again, such marshaling can comprise modification to the source code, including the addition of source code that stores parameters that would otherwise have been passed as part of the function call, for example, into an array, and then modifies the source code invoking such a function to pass only a pointer to that array.

Because the mechanisms described herein are independent of, and can be implemented for, any protective scheme and enclave implementation, the steps performed by the compiler can include the addition of source code to perform functionality that may be specific to particular types of enclaves. For example, one type of enclave may protect computer-executable instructions from modification, while other types of enclaves may have less rigorous protections. In the latter instance, for example, the compiler can insert verification code, such as that illustrated at step 345, to verify the computer-executable instructions that perform the functions identified as protected prior to their execution to ensure that they were not modified. To emphasize the optional nature of certain steps, such as step 345, it is shown with dashed lines in FIG. 3.

In an analogous manner, the compiler can insert source code that can perform a decryption of computer-executable instructions, which will be generated by the compiler as part of the compilation process, that will perform functions identified as being protected. More specifically, while most of the computer-executable instructions that are to be executed from within an enclave will be encrypted, when they are not being executed from within the enclave, certain computer-executable instructions can remain in unencrypted form so that they can decrypt, within the enclave, those other computer-executable instructions. The source code invoking such decryption can be inserted by the compiler at step 350.

Subsequently, at step 355, the compiler can compile the source code, including with the modifications and additions detailed above, into modules comprised of computer-executable instructions, often referred to as "byte code". As part of such compilation, at step 355, the computer-executable instructions, generated by the compiler in accordance with the source code, that implement functions identified by the developer as being protected, such computer-executable instructions can be packaged into one or more separate modules comprising only such computer-executable instructions, to the exclusion of computer-executable instructions implementing functions that were not identified by the developer as being protected. The compiler can then, as part of the compilation at step 355, associate metadata with such modules, which metadata can then subsequently be utilized, such as in the manner detailed above, to identify those modules that are to be encrypted, such as by independently executing processes, including processes being executed on separate computing devices maintained by entities separate from the software application program developer or programmer. As indicated previously, such modules can include portable executable modules, dynamically linked library modules, and other like computer-recognizable modules. The compilation of the annotated source code, received at step 310, can then end with the generation of modules comprising computer-executable instructions, as illustrated by step 360.

Figure 4:
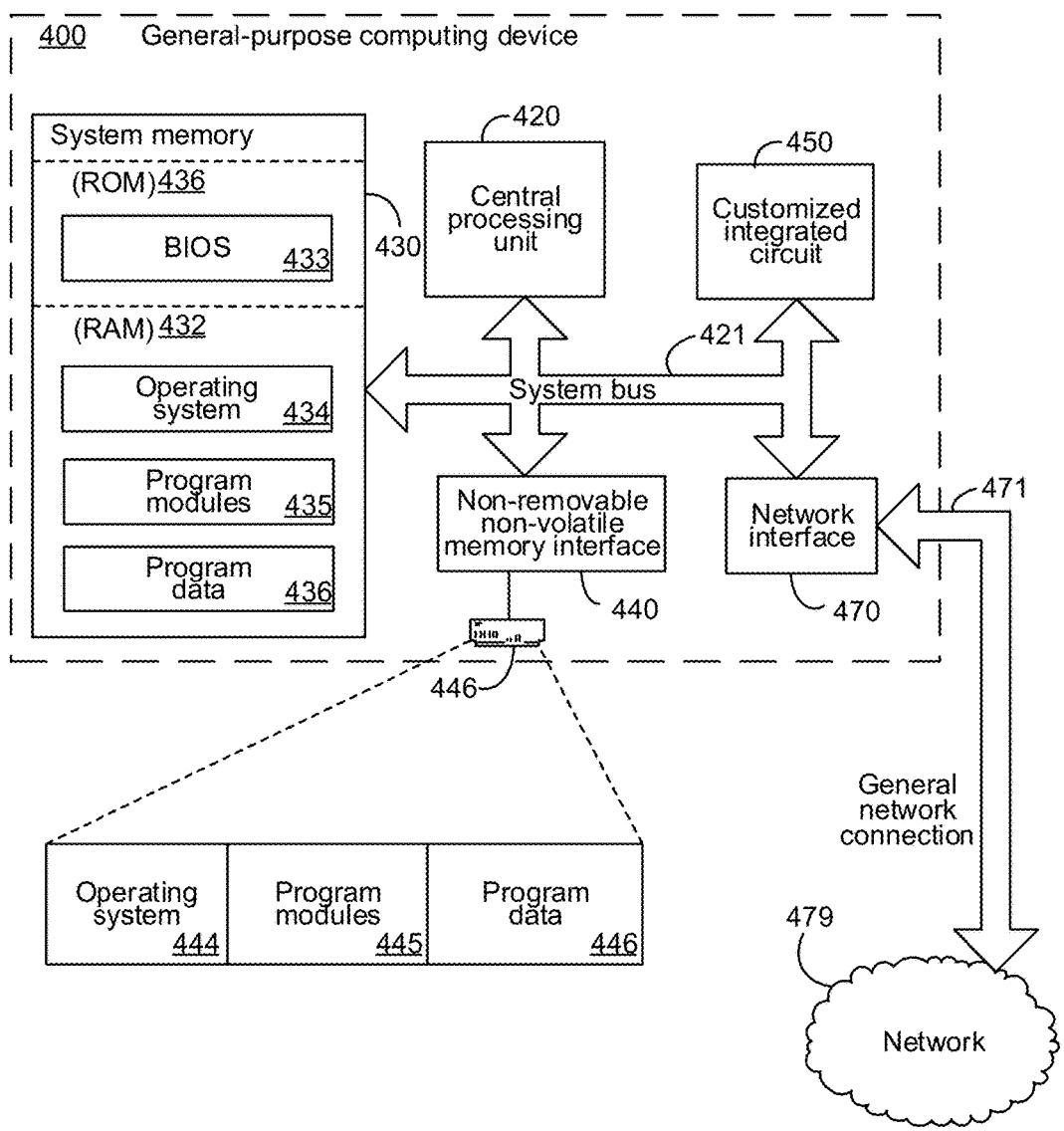
FIG. 4 is a block diagram of an exemplary computing device in which the exemplary customized circuit could be integrated.

Turning to FIG. 4, an exemplary computing device 400 is shown therein, which can be utilized to perform the mechanisms detailed above. The exemplary computing device 400 can comprise one or more general-purpose processing units, such as the exemplary CPU 420, an exemplary customized integrated circuit 450, such as one or more Field-Programmable Gate Arrays (FPGAs), as well as a system memory 430, and a system bus 421 that couples various system components including the system memory to the processing unit 420 and the customized integrated circuit 450. The system bus 421 may be any of several types of bus structures including a memory bus or memory controller, a peripheral bus, and a local bus using any of a variety of bus architectures. Depending on the specific physical implementation, one or more of the CPUs 420, the customized integrated circuit 450, the system memory 430 and other components of the computing device 400 can be physically co-located, such as on a single chip or silicon die or on a single circuit board. In such a case, some or all of the system bus 421 can be nothing more than silicon pathways within a single chip structure or on a single die and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. Computer storage media, however, does not include communication media. Communication media embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 641 and random access memory (RAM) 432. A basic input/output system 433 (BIOS), containing the basic routines that help to transfer information between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, other program modules 435, and program data 436.

The computing device 400 may also include other removable/non-removable, volatile/nonvolatile computer storage media. By way of example only, FIG. 4 illustrates a hard disk drive 441 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media, as defined and delineated above. The hard disk drive 441 is typically connected to the system bus 421 through a non-volatile memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 may operate in a networked environment using logical connections to one or more remote computers. The computing device 400 is illustrated as being connected to the general network connection 471 through a network interface or adapter 470, which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 471. It will be appreciated that the network connections shown are exemplary and other means of establishing a communications link between computing devices may be used.

Although described as a single physical device, the exemplary computing device 400 can be a virtual computing device, in which case the functionality of the above-described physical components, such as the CPU 420, the system memory 430, the network interface 470, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 400 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a computing device comprising: one or more processing units; and one or more computer-readable media comprising computer-executable instructions which, when executed by the one or more processing units, cause the computing device to: obtain annotated source code, portions of which are identified as protected functionality; modify a call to a protected function, defined by the identified portions, to marshal parameters provided as part of the call to the protected function prior to the modification; modify one or more address identifiers within the identified portions to be position-independent; compile the annotated source code such that the identified portions are compiled into one or more protected modules; and associate metadata with the one or more protected modules indicative of the one or more protected modules being executable only within an enclave.

A second example is the computing device of the first example, wherein the identified portions are identified by keywords inline in the annotated source code.

A third example is the computing device of the first example, wherein the identified portions are identified in a file separate from files comprising the source code.

A fourth example is the computing device of the first example, wherein the computer-executable instructions causing the modification of the call comprise further computer-executable instructions, which, when executed by the one or more processing units, cause the computing device to: modify the call to pass only a single parameter that is associated with an array, wherein elements of the array are, individually, associated with one of the parameters provided as part of the call to the protected function.

A fifth example is the computing device of the first example, wherein the computer-executable instructions causing the modification of the call comprise further computer-executable instructions, which, when executed by the one or more processing units, cause the computing device to: modify the call to the protected function to marshal parameters comprising output of the protected function.

A sixth example is the computing device of the first example, wherein the computer-executable instructions causing the modification of the call comprise further computer-executable instructions, which, when executed by the one or more processing units, cause the computing device to: replace the call to the protected function with a call to a gatekeeper function, the gatekeeper function then, in turn, calling the protected function.

A seventh example is the computing device of the first example, wherein the one or more address identifiers comprise an instruction pointer.

An eighth example is the computing device of the first example, wherein the one or more address identifiers comprise a program counter.

A ninth example is the computing device of the first example, wherein the protected function is associated with a determination of life points in a game comprised, in part, of the one or more protected modules.

A tenth example is the computing device of the first example, wherein the computer-readable media comprise further computer-executable instructions which, when executed by the one or more processing units, cause the computing device to: insert, into the annotated source code, a call to a decryption function to decrypt at least some of the one or more protected modules within the enclave.

An eleventh example is the computing device of the first example, wherein the computer-readable media comprise further computer-executable instructions which, when executed by the one or more processing units, cause the computing device to: insert, into the annotated source code, a verification of computer-executable instructions performing the protected function prior to proceeding with the call to the protected function.

A twelfth example is the computing device of the first example, wherein the computer-readable media comprise further computer-executable instructions which, when executed by the one or more processing units, cause the computing device to: encrypt the one or more protected modules based on the metadata associated therewith; and associate cryptographic information useable to decrypt the encrypted one or more protected modules with a license to a software application program comprising the encrypted one or more protected modules.

A thirteenth example is a system comprising: a developer computing device comprising: one or more developer computing device processing units; and one or more developer computing device computer-readable media comprising computer-executable instructions which, when executed by the one or more developer computing device processing units, cause the developer computing device to: obtain annotated source code, portions of which are identified as protected functionality; modify a call to a protected function, defined by the identified portions, to marshal parameters provided as part of the call to the protected function prior to the modification; modify one or more address identifiers within the identified portions to be position-independent; compile the annotated source code such that the identified portions are compiled into one or more protected modules; and associate metadata with the one or more protected modules indicative of the one or more protected modules being executable only within an enclave; and a product store computing device comprising: one or more product store computing device processing units; and one or more product store computing device computer-readable media comprising computer-executable instructions which, when executed by the one or more product store computing device processing units, cause the product store computing device to: encrypt the one or more protected modules based on the metadata associated therewith.

A fourteenth example is the system of the thirteenth example, wherein the one or more developer computing device computer-readable media comprise further computer-executable instructions which, when executed by the one or more developer computing device processing units, cause the developer computing device to: compile the annotated source code such that portions other than the identified portions are compiled into one or more unprotected modules; and wherein further the one or more product store computing device computer-readable media comprise further computer-executable instructions which, when executed by the one or more product store computing device processing units, cause the product store computing device to: construct a software application program package from the encrypted one or more protected modules and the one or more unprotected modules.

A fifteenth example is the system of the thirteenth example, wherein the one or more product store computing device computer-readable media comprise further computer-executable instructions which, when executed by the one or more product store computing device processing units, cause the product store computing device to: associate cryptographic information useable to decrypt the encrypted one or more protected modules with a license to a software application program comprising the encrypted one or more protected modules.

A sixteenth example is the system of the thirteenth example, further comprising a client computing device comprising: one or more client computing device processing units; and one or more client computing device computer-readable media comprising computer-executable instructions which, when executed by the one or more client computing device processing units, cause the client computing device to: decrypt, within a first enclave, a first cryptographic information; provide the first cryptographic information from the first enclave to a second enclave through a secure channel established between the first and second enclaves; and execute a software application program by decrypting the encrypted one or more protected modules, within the second enclave, utilizing the first cryptographic information, and then executing the one or more protected modules from the second enclave.

A seventeenth example is the system of the sixteenth example, wherein the one or more client computing device computer-readable media comprise further computer-executable instructions which, when executed by the one or more client computing device processing units, cause the client computing device to: obtain identifiers from two or more components of the client computing device; and receive, based on the obtained identifiers, a second cryptographic information; wherein the decrypting of the first cryptographic information is performed with the received second cryptographic information.

An eighteenth example is the system of the sixteenth example, wherein the one or more client computing device computer-readable media have stored thereon the first cryptographic information in an encrypted form.

A nineteenth example is a system comprising: a product store computing device comprising: one or more product store computing device processing units; and one or more product store computing device computer-readable media comprising computer-executable instructions which, when executed by the one or more product store computing device processing units, cause the product store computing device to: encrypt one or more protected modules of a software application program based on the metadata associated therewith; and a client computing device comprising: one or more client computing device processing units; and one or more client computing device computer-readable media comprising computer-executable instructions which, when executed by the one or more client computing device processing units, cause the client computing device to: decrypt, within a first enclave, a first cryptographic information; provide the first cryptographic information from the first enclave to a second enclave through a secure channel established between the first and second enclaves; and execute the software application program by decrypting the encrypted one or more protected modules, within the second enclave, utilizing the first cryptographic information, and then executing the one or more protected modules from the second enclave.

A twentieth example is the system of the nineteenth example, wherein the one or more client computing device computer-readable media comprise further computer-executable instructions which, when executed by the one or more client computing device processing units, cause the client computing device to: obtain identifiers from two or more components of the client computing device; and receive, based on the obtained identifiers, a second cryptographic information; wherein the decrypting of the first cryptographic information is performed with the received second cryptographic information.

As can be seen from the above descriptions, mechanisms for facilitating the modularization of computer-executable instructions to provide for antipiracy and anti-cheat aspects have been presented. In view of the many possible variations of the subject matter described herein, we claim as our invention all such embodiments as may come within the scope of the following claims and equivalents thereto.

We claim:

1. A computing device comprising:
one or more processing units; and
one or more computer-readable storage media comprising computer-executable instructions which, when executed by the one or more processing units, cause the computing device to:
obtain annotated source code, portions of which are identified as protected functionality;
modify a call to a protected function, defined by the identified portions, to marshal parameters provided as part of the call to the protected function prior to the modification;
modify one or more references to an instruction pointer or a program counter within the identified portions to be position-independent;
compile the annotated source code such that the identified portions are compiled into one or more protected modules; and
identify the one or more protected modules as being executable only within an enclave.

2. The computing device of claim 1, wherein the identified portions are identified by keywords inline in the annotated source code.

3. The computing device of claim 1, wherein the identified portions are identified in a file separate from files comprising the source code.

4. The computing device of claim 1, wherein the computer-executable instructions causing the modification of the call comprise further computer-executable instructions, which, when executed by the one or more processing units, cause the computing device to:
modify the call to pass only a single parameter that is associated with an array, wherein elements of the array are, individually, associated with one of the parameters provided as part of the call to the protected function.

5. The computing device of claim 1, wherein the computer-executable instructions causing the modification of the call comprise further computer-executable instructions, which, when executed by the one or more processing units, cause the computing device to:
modify the call to the protected function to marshal parameters comprising output of the protected function.

6. The computing device of claim 1, wherein the computer-executable instructions causing the modification of the call comprise further computer-executable instructions, which, when executed by the one or more processing units, cause the computing device to:
replace the call to the protected function with a call to a gatekeeper function, the gatekeeper function then, in turn, calling the protected function.

7. The computing device of claim 1, wherein the protected function is associated with a determination of life points in a game comprised, in part, of the one or more protected modules.

8. The computing device of claim 1, wherein the computer-readable media comprise further computer-executable instructions which, when executed by the one or more processing units, cause the computing device to:
insert, into the annotated source code, a call to a decryption function to decrypt at least some of the one or more protected modules within the enclave.

9. The computing device of claim 1, wherein the computer-readable media comprise further computer-executable instructions which, when executed by the one or more processing units, cause the computing device to:
insert, into the annotated source code, a verification of computer-executable instructions performing the protected function prior to proceeding with the call to the protected function.

10. The computing device of claim 1, wherein the computer-readable media comprise further computer-executable instructions which, when executed by the one or more processing units, cause the computing device to:
encrypt the one or more protected modules based on the metadata associated therewith; and associate cryptographic information useable to decrypt the encrypted one or more protected modules with a license to a software application program comprising the encrypted one or more protected modules.

11. A system comprising:
a developer computing device comprising:
one or more developer computing device processing units; and
one or more developer computing device computer-readable storage media comprising computer-executable instructions which, when executed by the one or more developer computing device processing units, cause the developer computing device to:
obtain annotated source code, portions of which are identified as protected functionality;
modify a call to a protected function, defined by the identified portions, to marshal parameters provided as part of the call to the protected function prior to the modification;
modify one or more references to an instruction pointer or a program counter within the identified portions to be position-independent;
compile the annotated source code such that the identified portions are compiled into one or more protected modules; and
identify the one or more protected modules as being executable only within an enclave; and
a product store computing device comprising:
one or more product store computing device processing units; and
one or more or more product store computing device computer-readable storage media comprising computer-executable instructions which, when executed by the one or more product store computing device processing units, cause the product store computing device to:
encrypt the one or more protected modules based on the identification of the one or more protected modules as being executable only within an enclave.

12. The system of claim 11, wherein the one or more or more developer computing device computer-readable media comprise further computer-executable instructions which, when executed by the one or more developer computing device processing units, cause the developer computing device to:
compile the annotated source code such that portions other than the identified portions are compiled into one or more unprotected modules; and
wherein further the one or more or more product store computing device computer-readable media comprise further computer-executable instructions which, when executed by the one or more product store computing device processing units, cause the product store computing device to:
construct a software application program package from the encrypted one or more protected modules and the one or more unprotected modules.

13. The system of claim 11, wherein the one or more or more product store computing device computer-readable media comprise further computer-executable instructions which, when executed by the one or more product store computing device processing units, cause the product store computing device to:
associate cryptographic information useable to decrypt the encrypted one or more protected modules with a license to a software application program comprising the encrypted one or more protected modules.

14. The system of claim 11, further comprising a client computing device comprising:
one or more client computing device processing units; and
one or more or more client computing device computer-readable media comprising computer-executable instructions which, when executed by the one or more client computing device processing units, cause the client computing device to:
decrypt, within a first enclave, a first cryptographic information;
provide the first cryptographic information from the first enclave to a second enclave through a secure channel established between the first and second enclaves; and
execute a software application program by decrypting the encrypted one or more protected modules, within the second enclave, utilizing the first cryptographic information, and then executing the one or more protected modules from the second enclave.

15. The system of claim 14, wherein the one or more client computing device computer-readable media comprise further computer-executable instructions which, when executed by the one or more client computing device processing units, cause the client computing device to:
obtain identifiers from two or more components of the client computing device; and
receive, based on the obtained identifiers, a second cryptographic information;
wherein the decrypting of the first cryptographic information is performed with the received second cryptographic information.

16. The system of claim 14, wherein the one or more client computing device computer-readable media have stored thereon the first cryptographic information in an encrypted form.

17. A system comprising:
a product store computing device comprising:
one or more product store computing device processing units; and
one or more or more product store computing device computer-readable storage media comprising computer-executable instructions which, when executed by the one or more product store computing device processing units, cause the product store computing device to:
encrypt one or more protected modules of a software application program based on the metadata associated therewith; and
a client computing device comprising:
one or more client computing device processing units; and
one or more or more client computing device computer-readable storage media comprising computer-executable instructions which, when executed by the one or more client computing device processing units, cause the client computing device to:
decrypt, within a first enclave, a first key;
provide the first key from the first enclave to a second enclave through a secure channel established between the first and second enclaves; and
execute the software application program by decrypting, within the second enclave, the encrypted one or more protected modules with the first key, and then executing the decrypted one or more protected modules from the second enclave.

18. The system of claim 17, wherein the one or more client computing device computer-readable media comprise further computer-executable instructions which, when executed by the one or more client computing device processing units, cause the client computing device to:
- obtain identifiers from two or more components of the client computing device; and
- receive, based on the obtained identifiers, a second key;
- wherein the decrypting of the first key is performed with the received second key.

19. The system of claim 11, wherein the identified portions are identified in a file separate from files comprising the source code.

20. The system of claim 11, wherein the one or more or more product store computing device computer-readable media comprise further computer-executable instructions which, when executed by the one or more product store computing device processing units, cause the product store computing device to:
- insert, into the annotated source code, a verification of computer-executable instructions performing the protected function prior to proceeding with the call to the protected function.

\* \* \* \* \*